US011257124B2

(12) United States Patent
L'Huillier et al.

(10) Patent No.: US 11,257,124 B2
(45) Date of Patent: *Feb. 22, 2022

(54) METHOD FOR DETERMINING PROVIDER PARAMETERS INCLUDING A PROVIDER MARGIN

(71) Applicant: Groupon, Inc., Chicago, IL (US)

(72) Inventors: Gaston L'Huillier, San Francisco, CA (US); Francisco Larrain, Palo Alto, CA (US); Kamson Lai, Chicago, IL (US); Amit Koren, Mountain View, CA (US)

(73) Assignee: Groupon, Inc., Chicago, IL (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/265,087

(22) Filed: Feb. 1, 2019

(65) Prior Publication Data

US 2019/0303979 A1 Oct. 3, 2019

Related U.S. Application Data

(63) Continuation of application No. 13/832,804, filed on Mar. 15, 2013, now Pat. No. 10,235,696.

(60) Provisional application No. 61/770,174, filed on Feb. 27, 2013.

(51) Int. Cl.
*G06Q 30/02* (2012.01)

(52) U.S. Cl.
CPC .............................. *G06Q 30/0274* (2013.01)

(58) Field of Classification Search
CPC .................................................. G06Q 30/0274
See application file for complete search history.

(56) References Cited

U.S. PATENT DOCUMENTS

| 2003/0120577 | A1* | 6/2003 | Sakui ..................... G06Q 40/06 705/36 R |
| 2008/0243756 | A1* | 10/2008 | Moon ................. G06Q 30/0272 |
| 2013/0085804 | A1* | 4/2013 | Leff .................... G06Q 30/0219 705/7.29 |
| 2016/0125454 | A1* | 5/2016 | Karloff .............. G06Q 30/0249 705/14.48 |

* cited by examiner

*Primary Examiner* — Azam A Ansari
(74) *Attorney, Agent, or Firm* — Alston & Bird LLP (57) ABSTRACT

Provided herein are system, methods and computer readable storage media in facilitating the determination of provider parameters, such as a provider margin, for a promotion of the provider's goods, services, and/or the like in an agreement between the provider, also known as a merchant, and a promotion and marketing service that is configured to illustrate or otherwise inform consumers of the availability of one or more instruments for a promotion. In providing such functionality, the system may be configured to, for example, receive provider characteristic data, determine historical provider information, receive provider promotion structure data, determine a provider profile, determine a positive return on investment threshold, and transmit a provider parameter.

18 Claims, 5 Drawing Sheets

METHOD FOR DETERMINING PROVIDER PARAMETERS INCLUDING A PROVIDER MARGIN

CROSS-REFERENCE TO RELATED APPLICATION

This application is a continuation of U.S. application Ser. No. 13/832,804 filed Mar. 15, 2013 and claims the benefit of U.S. Provisional Patent Application No. 61/770,174, filed Feb. 27, 2013, the entire contents of which are incorporated herein by reference.

TECHNICAL FIELD

The present description relates to determining parameters for a promotion between a provider of goods, services, experiences and/or the like and a promotion and marketing service configured to illustrate or otherwise inform consumers of the availability of one or more instruments for a promotion. This description more specifically relates to determining parameters for transactions between providers and a promotion and marketing service.

BACKGROUND

Merchants sell goods and services, also known as products, to consumers. The merchants, also known as providers, can often control the form of their product offers, the timing of their product offers, and the price at which the products will be offered. The provider may sell products at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide and redeem discounts used by consumers have been identified. Through applied effort, ingenuity, and innovation, many of these identified problems have been solved by developing solutions that are included in embodiments of the present invention, some examples of which are described herein.

BRIEF SUMMARY

In general, example embodiments of the present invention provide herein systems, methods and computer readable storage media for facilitating the determination of provider parameters between a provider of goods, services, experiences and/or the like and a promotion and marketing in a simple and user-friendly manner. Among other things, embodiments discussed herein can be configured to determine a provider parameter, such as a provider margin, for a provider. Some embodiments may be configured to receive data corresponding to at least one provider characteristic, determine a provider parameter, such as a provider margin, and transmit data corresponding to the provider parameter to an interface for the provider to review and accept.

Some embodiments discussed herein can be configured to aid a promotion and marketing service representative to establish provider parameters, such as a provider margin, which promote efficient closing of transactions with one or more providers. Some embodiments may be configured to aid a promotion and marketing service in defining provider parameters, redemption parameters, and/or other parameters associated with a promotion provided by a merchant, also known as a provider.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different, or fewer components may be provided.

As used herein, the term "provider," "merchant," and similar terms may be used interchangeably to refer to, but not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a spa company that that provides spa and health services to a consumer.

In addition, as used herein, the term "promotion and marketing service" may include, but is not limited to, a service that is accessible via one or more computing devices and is operable to provide example promotion and/or marketing services on behalf of one or more providers that are offering one or more instruments that are redeemable by consumers for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the spa company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impressions" may include, but is not limited to, a communication, a display, or other perceived indication, such as a flyer, print media, e-mail, text message, application alert, mobile applications, other type of electronic interface or distribution channel and/or the like, of one or more promotions. For example, and using the aforementioned spa company as the example provider, an e-mail communication sent to consumers that indicates the availability of a $25 for $50 toward spa services promotion.

Overview

As discussed herein, a provider of goods, services, experiences and the like (e.g. a spa company that provides spa and health services and products) may engage with a promotion and marketing service for providing promotion and/or marketing services on behalf of the provider. For example, the promotion and marketing service may transmit to a number of consumers impressions associated with a promotion for a good, service, and/or the like provided by a provider (e.g., an e-mail indicating a consumer may purchase $40 worth of spa services from Acme Spa Company for $20). In addition, the promotion and marketing service may accept payments for the promotion from a consumer and issue a promotion instrument to a consumer for the payment. Accordingly, the consumer may present and redeem the promotion instrument to the provider in exchange for goods or services (e.g., the consumer may visit an Acme Spa Company location and obtain $40 worth of spa services by presenting the $20 for $40 promotion instrument). In exchange for providing the promotion and/or marketing service, the promotion and marketing service may retain a portion of the revenue received from the consumer and provide the provider with the remainder of the revenues (e.g. the marketing and promotion service may retain $5 of the $20 and provide Acme Spa Company with $15 of the $20 paid by the consumer for the instrument).

Embodiments discussed herein may be configured to provide for determining a provider parameter, such as a provider margin or other terms associated with a transaction between a promotion and marketing service and one or more providers. According to some embodiments, the promotion and marketing service may define and/or determine provider parameters, which may include parameters, terms, bounds, considerations and/or the like that outline or otherwise define the term, timing, constraints, limitations, rules, or the like that embody economically efficient transactions between the promotion or marketing service and one or more providers. A provider parameter may further include the location or method of presenting an impression to a consumer (i.e., a prominent promotion placement, number of impressions, and/or the like), the type of consumer the impression is provided to (i.e., high-value consumers are presented with the impression), and/or the like.

In one embodiment, determining a provider parameter may include determining a provider margin, which may be defined by the percentage of revenue retained and/or received by a provider, such as a merchant, business owner, vendor, and/or the like, from the total amount of revenue received from a consumer in association with the purchase and redemption of a promotion. A promotion and marketing service may receive the remainder of the total amount of revenue (i.e., total revenue received minus the provider margin) received from a consumer in conjunction for providing such promotion and marketing services.

Various embodiments of the invention are directed to determining a provider margin (or other provider parameters) that promotes an efficient economic transaction between the provider and the promotion and marketing service. Said differently, such embodiments are directed to selecting a provider margin that is fair enough to both parties such that, on average, the likelihood of non-acceptance by either party of the selected provider margin is a low as possible. Embodiments may also be directed to selecting a provider margin that, on average, will be accepted by a provider upon the first presentation of the provider margin. In this regard, one advantage that may be realized by some embodiments discussed herein is that determining a provider margin may decrease the amount of time spent negotiating between a provider and a promotion and marketing service. For example, a desirable provider margin may be pre-established for a particular type of provider located in a particular location. As such, the provider and promotion and marketing service may be presented with an initial provider margin that is mutually agreeable.

Another embodiment may advantageously provide for providing a provider margin to a good provider that is indicative of its high value status, while also providing a provider margin to a bad provider that is indicative of its relatively lower value status. For example, a provider may be rated by a number of factors, such as average consumer reviews, social media presence, consumer protection agency ratings, negative press coverage, return or refund rate, return or refund amount, and/or the like. As such, good providers, i.e., those with a higher rating, may advantageously be provided with a provider margin indicative of the higher rating, while bad providers, i.e., those with lower ratings, may be provided with a lower provider margin indicative of the lower rating. In some embodiments, a good provider and a bad provider may receive different provider margins even in an instance where the good provider and the bad provider are located in the same or similar locations and provide the same or similar goods or services.

Further, another advantage that may be realized by some embodiments discussed herein is that extreme provider margins (i.e., outlier provider margins that are relatively too high or low) may be eliminated by providing a pre-established provider margin for a provider. Provider margins have historically been negotiated between a provider and a promotion and marketing service on an individual basis. Accordingly, provider margins may vary by a number of factors, which may produce extreme provider margins that are statistical outliers. As such, embodiments of the present invention may advantageously provide for decreasing the number of extreme provider margins by providing a pre-established provider margin.

The foregoing description applies the inventive concepts herein described to a provider margin as an exemplary provider parameter. This application is provided for ease of illustration and is not intended to limit the scope of the claimed subject matter. Indeed, as will be apparent to one of ordinary skill in the art in view of this disclosure, the inventive concepts herein described may also be applied to other provider parameters.

Figure 1:
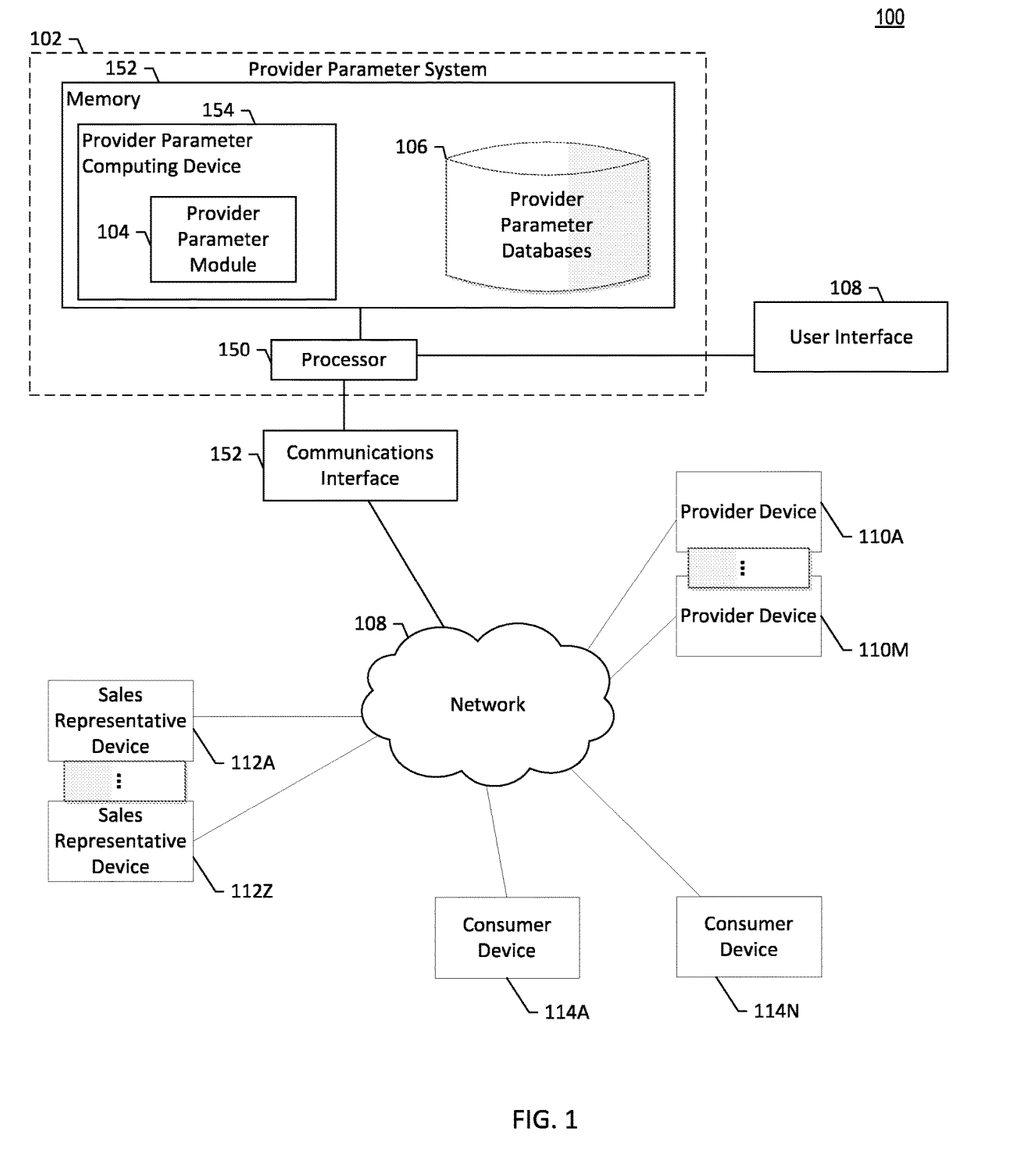
FIG. 1 illustrates an example system in accordance with some embodiments discussed herein.

FIG. 1 illustrates a system 100 including an example network architecture, which may include one or more devices and sub-systems that are configured to implement some embodiments discussed herein. For example, system 100 may include provider parameter system 102, which may include, for example, a processor 150, a memory 152, a provider parameter computing device 154, a provider parameter module 104 and a provider parameter database 106. Provider parameter module 104 can be any suitable network server and/or other type of processing device, such as a provider parameter computing device 154. Provider parameter database 106 can be any suitable network database configured to store provider characteristics, historical promotion and/or provider data, and/or analytics data, such as that discussed herein. In this regard, provider parameter system 102, may include for example, at least one backend data server, network database, cloud computing device, among other things. As discussed herein, the provider device 110A,110M, the sales representative device 112A,112Z, and/or the consumer device 114A, 114N may be any suitable mobile device, such as a cellular phone, tablet computer, smartphone, etc., or other type of mobile processing device that may be used for any suitable purpose.

Provider parameter system 102 may be coupled to one or more of the provider devices 110A, 110M, sales representative devices 112A, 112Z, and/or consumer devices 114A, 114N, (e.g., mobile device) via a communications interface 152 that is configured to communicate with network 108. In this regard, network 108 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 108 may include a cellular telephone, a 402.11, 402.16, 402.20, and/or WiMax network. Further, the network 108 may include a public network, such as the Internet, a private network, such as an intranet, or combinations thereof, and may utilize a variety of networking protocols now available or later developed including, but not limited to TCP/IP based networking protocols.

Figure 2:
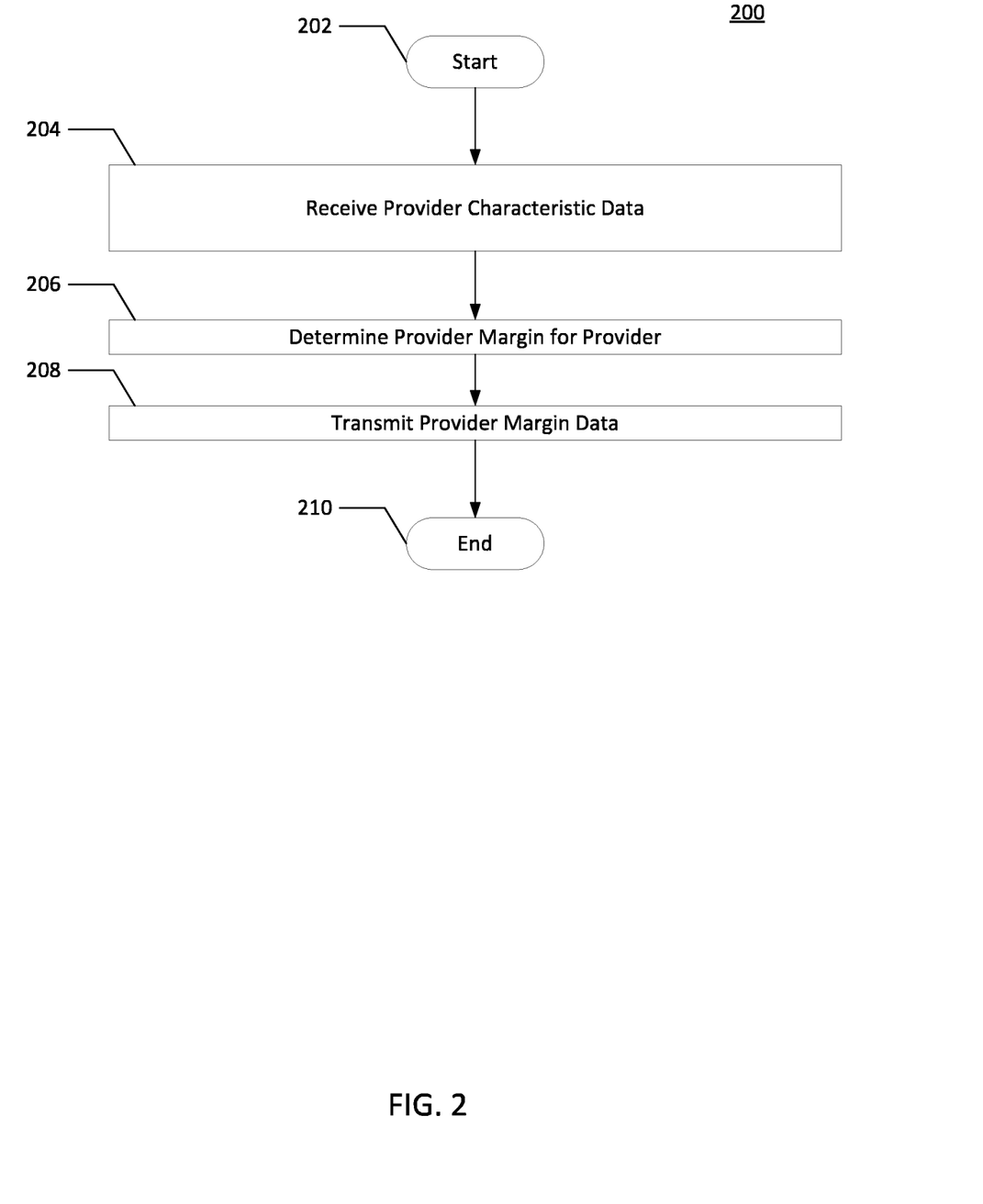
FIG. 2 illustrates a flow chart detailing a method of determining a provider parameter according to an example embodiment.

FIG. 2 illustrates a flow chart for an example embodiment of a method 200 of determining a provider margin that may be outputted and/or transmitted in a number of ways. For example, in one embodiment, a provider may access a web-based secure provider interface via a provider device, such as a mobile device, such as a mobile device, a smartphone, a laptop, a mobile computing device, a tablet computing device, and/or the like, and receive information corresponding to a number of promotions the provider may offer and the respective provider margin for each of those promotions. The respective provider margins may be determined on an individual basis. In another embodiment, a sales representative may access a web-based secure sales representative interface via a sales representative device, such as a mobile device, such as a mobile device, a smartphone, a laptop, a mobile computing device, a tablet computing device, and/or the like, and receive information corresponding to a particular provider margin for a provider so as to begin a negotiation process with the provider.

Method 200 may begin at 202 and proceed to 204, where a provider parameter system may receive provider characteristic data from a mobile device, such as a provider device 110A. For example, a provider may access a secure web-based provider interface and transmit provider characteristic data to the provider parameter system. The provider may transmit provider characteristic data, such as registration information, provider name, provider category, provider location, and/or the like via a provider device 110.

In another embodiment, a representative of a promotion and marketing service may negotiate with a provider for providing promotion and marketing services for the provider's goods and/or services. In exchange for presenting the availability of one or more instruments that are redeemable for goods, services, experiences and/or the like, the promotion and marketing service may receive a portion of the revenue received by the provider from the consumer. Accordingly, the sales representative may obtain information corresponding to the provider characteristic data and transmit the provider characteristic data to the provider parameter system via a sales representative device.

In some embodiments, the provider may initially provide the provider characteristic data by pre-registering as a provider with the promotion and marketing service. Accordingly, subsequent transactions may not require the provider to provide provider characteristic data to the provider parameter system. In another embodiment, the provider may provide provider characteristic data to the provider parameter system in real-time to support a determination of the provider margin (i.e., if the provider has not pre-registered or if, for example, the provider is a mobile provider and changes locations from time to time).

In one embodiment, a provider characteristic may be the location from where the provider provides the good, service, or experience to the consumer. In some embodiments, the provider characteristic may include a public provider rating or ranking, such as a provider rating from a social media website or the provider rating from public reviews deposited with the promotion and marketing service. Another provider characteristic may be the type or category of goods, services, experiences the provider provides a consumer. A category need not be limited to a particular type of good, service, experience or the like the provider provides the consumer. In some embodiments, the provider category may be based upon any suitable aggregation of providers. According to one embodiment, a category may be based upon a particular service that is provided to a consumer. For example, one category may be defined as a spa and health service. Accordingly, providers that may be included within the category need not be limited to only spa and health service providers, but may include other providers that offer spa and health services in addition to other services. For example, a fitness club, gym, hotel property, or resort property may all provide health and spa services in addition to other goods and services. Accordingly, a category for health and spa services may include health spas, and in addition, a fitness club, gym, hotel property, and resort property that all provide health and spa services.

At 206, the provider parameter system may be configured to determine the provider margin based, at least in part, on the provider characteristic data received from the mobile device. For example, the provider parameter system may receive data indicating a particular provider is located in a particular city. Accordingly, the provider parameter system may be configured to determine that a provider margin for a provider located in that particular city should be 60% of the total revenue received from the consumer. As disclosed in further detail herein, the provider parameter system may be configured to determine the provider margin based on a number of factors including, but not limited to, the provider's historical transactions with the promotion and marketing service, the redemption parameters of a particular promotion and/or the like.

At 208, the provider parameter system may be configured to transmit data corresponding to the provider margin to a mobile device, such as the provider device 110. As such, the provider may receive data corresponding to a number of promotions available for the provider to implement, such as the provider margin that is determined individually for each of the promotions. In another embodiment, a sales representative of the promotion and marketing service may be provided with the provider margin for a particular provider wishing to engage the promotion and marketing service for a specific promotion having predefined redemption parameters. The method may end at 210.

Example Provider Margin Calculation

Figure 3:
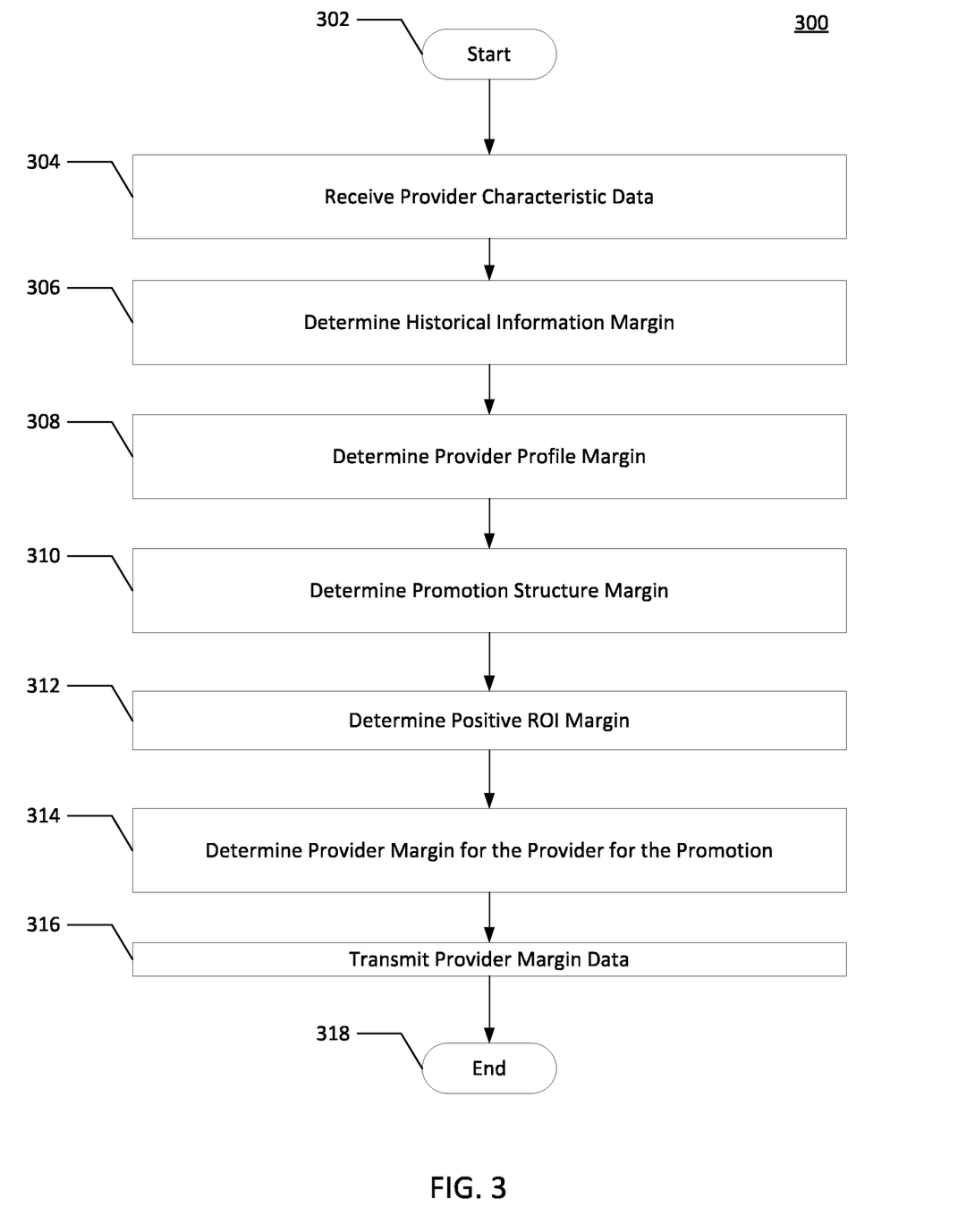
FIG. 3 illustrates a flow chart detailing a method of determining a provider parameter according to an example embodiment.

FIG. 3 illustrates a flow chart for another example embodiment of a method of determining a provider parameter, such as a provider margin, that should be provided to an example provider, e.g., Acme Spa Company. In some embodiments, the method may be performed by at least one mobile device. As will be apparent to one of ordinary skill in the art in view of this disclosure, although FIG. 1 illustrates a method of determining a provider parameter with a system, such as a provider parameter system 102 of FIG. 1.

Method 300 begins at 302 and proceeds to 304, where a provider parameter system may be configured to receive provider characteristic data from a provider. As mentioned previously, a provider may be able to access an application, web-based interface, or the like on a provider device configured to communicate with the provider parameter system. The provider and/or merchant may provide data corresponding to at least one provider characteristic to the provider device configured to communicate with the provider parameter system. For example, a manager of Acme Spa Company may be able to access a web-based interface configured to communicate with the provider parameter system. The manager may provide the provider device with information, such as the location of Acme Spa Company. In another embodiment, a representative of the promotion and marketing service may provide data corresponding to at least one provider characteristic to a sales representative device configured to communicate with the provider parameter system.

At 306, the provider parameter system may be configured to determine a historical information margin. For example, the historical information margin may be determined, at least in part, by previous provider margins offered to providers of the selected provider category (i.e., spa and health services for the provider Acme Spa Company). In another embodiment, the historical information margin may be determined, at least in part, by previous provider margins given to providers of the selected provider category (i.e., spa and health services for the provider Acme Spa Company) with an increase or decrease to the provider margin being applied based, at least in part, on consumer reviews of the provider. For example, if the average consumer reviews of Acme Spa Company is greater than the average reviews of providers in the same category (i.e., spa and health services), than Acme Spa Company may receive a historical information margin that is equivalent to the average margin given to providers in the spa and health services plus an increase for the positive consumer reviews. Accordingly, embodiments herein may advantageously provide for positively influencing provider behavior by biasing providers towards providing desirable goods, services, and/or experiences for positive consumer ratings of the provider. As such, in return for the positive consumer ratings, a provider may receive a higher provider margin.

In various embodiments, a provider may be categorized based upon the provider's goods and/or services. Accordingly, consumers may be able to review, score, rate, and/or the like, a number of providers in a particular category of goods and/or services. In some embodiments, the average review score $\hat{r}(c)$ for a provider in a particular category c, may be expressed as, $$\hat{r}(c) = \frac{1}{|m \in M_c|} \sum_{m \in M_c} \hat{r}_m$$

where $M_c$ is the set of all providers that belong to the category and $\hat{r}_m$ is the average review score for the particular provider. In another embodiment, the average review score may be determined by a different aggregation function that is configured to provide a representation of the historical review score of the particular providers. The historical information margin $\mu_h$ for a particular provider $m_i$ may then be expressed as, $$\mu_h(m_i) = \bar{\mu}(m_i) + f(m_i, x)$$

where $\bar{\mu}(m_i)$ is the historical information margin for the provider $m_i$ and $f(m_i, x)$ is an increase or decrease in x, based on the consumer reviews of the provider determined by the equation, $$f(m_i, x) = \begin{cases} +x & \text{if } \hat{r}_{m_i} > \hat{r}(c_{m_i}) \\ -x & \text{if } \hat{r}_{m_i} \leq \hat{r}(c_{m_i}) \end{cases}$$

where $c_{m_i}$ is the provider category. As such, the provider parameter system may be configured to determine a provider margin, based at least in part, on the historical information margin of the particular provider. The increase or decrease in x may be approximately 0.05 in one embodiment. In another embodiment, the increase or decrease in x may be greater if a promotion and marketing service desires to award consumer reviews greater weight. In some embodiments, a reward or a penalty may be considered as a function that increases or decreases the historical margin respectively using any suitable modifying function, such as addition, subtraction, multiplication, division, and/or the like.

In one example embodiment, a provider, such as Acme Spa Company may institute a promotion with the promotion and marketing service whereby Acme Spa Company offers $40 worth of spa treatments for $20. Spa and health service providers may on average receive a provider margin of 0.53. Acme Spa Company, however, may have a consumer rating that is higher than the average consumer rating for all spa and health service providers. For example, the average overall consumer rating for spa and health service providers may be approximately 0.2, while the average overall consumer rating for Acme Spa Company is approximately 0.3. As such, in one embodiment, Acme Spa Company may receive an increase of 0.05 to the historical information margin based at least on having a higher average overall consumer rating. Accordingly, Acme Spa Company may receive a historical information margin of approximately 0.58 instead of the 0.53 (i.e., $\mu_h$(Acme)=0.53+0.05=0.58).

At 308, the provider parameter system may be configured to determine a provider profile margin based, at least in part, on the provider category, the provider location, the provider quality score, and/or the like. In some embodiments, the provider parameter system may be configured to determine the provider profile margin based on a provider quality score, which may be affected by consumer reviews of the provider, complaints received by consumer protection agencies corresponding to the provider, the provider's social media presence, amount of refunds issued, and/or other qualities, metrics, or measurements attributable to the provider. For example, a provider, such as Acme Spa Company, may have negative reviews with a consumer protection agency, may not have any social media presence, and may issue twice as many refunds than other spa and health service providers. As such, Acme Spa Company may have a low provider quality score. In some embodiment, additional qualities, metrics, measurements and the like may be determined by the promotion and marketing service. According to one embodiment, the provider profile margin $\mu_p$ for a particular provider $m_i$ may be defined by the equation, $$\mu_p(m_i) = \bar{\mu}(c_{m_i}, mqs_{m_i}, l_{m_i})$$

where the category $c_{m_i}$ is the category for the particular provider $m_i$, $mqs_{m_i}$ is the provider quality score for the particular provider $m_i$, and $l_{m_i}$ is the location of the particular provider $m_i$. According to some embodiments, the provider profile margin $\mu_p$ for a particular provider $m_i$ may be defined and/or determined by an aggregation function using the category of the particular provider $c_{m_i}$, the provider quality score $mqs_{m_i}$, and/or the location of the particular provider $l_{m_i}$ as inputs for variables. In other embodiments, the provider profile margin may be determined using an aggregation function that receives any number of inputs and/or aggregation methods. In one embodiment, a spa and health services provider, such as Acme Spa Company, may receive a provider profile margin of 0.59 for having a particular provider quality score, being located at a particular location, and being a provider for a the category of spa and health services.

At 310, the provider parameter system may be configured to determine a promotion structure margin $\mu_d$, based at least in part on redemption parameters of the promotion. In some embodiments, the promotion structure margin may be determined based in part on the discount d provided to the consumer and the total number of promotion units to sell u.

As the discount provided to the consumer increases, it is also desirable for the provider margin to increase to account for the loss in revenue to the provider by providing the higher consumer discount. In addition, as the total number of promotion units to sell increases, it is also desirable for the provider margin to increase to account for the greater number of promotion units to sell (and the corresponding greater value of the provider to the promotion and marketing service). As such, in one embodiment, the provider parameter system may be configured to determine a promotion structure margin as a linear combination according to the following equation, $$\mu_d(m_i, d, u) = \in \cdot \bar{\mu}_{discount}(c_{m_i}, q(d)) + (1 - \in) \cdot \bar{\mu}_{units}(c_{m_i}, q(u))$$

where $c_{m_i}$ is the category for the provider $m_i$, $\bar{\mu}_{discount}(c_{m_i}, q(d))$ is the average margin for the category $c_{m_i}$ and quartile q(d) for the discount d, $\bar{\mu}_{units}(c_{m_i}, q(u))$ is the average margin for category $c_{m_i}$ and quartile q(u) for the units u, and $\in$ is used to determine the linear combination of both factors, where $\in$ values between 0 and 1. According to some embodiments, the weighted sum of both factors and/or the averages in each case may considered as different aggregation functions that are configured to define a unified representation of the promotion structure margin.

The balancing between the discount provided and the units sold by the provider in determining the promotion structure margin may be accomplished by varying the value of $\in$. For example, in one embodiment, $\in$ may equal 0.5. As such, the promotion structure margin may be defined by an equation that equates (assumes as equal) the discounts provided by the provider and the number of promotion units sold. For example, in one embodiment, a provider, such as Acme Spa Company, may have a margin of 0.61 when a particular discount is provided and a margin of 0.59 when a particular number of units are provided. According to one embodiment, the values for the discount provided and the units sold by the provider in determining the promotion structure margin may be assumed to be equal (i.e., $\in$=0). As such, the promotion structure margin may be approximately 0.6, as the promotion structure margin is equal to 0.5·0.61+0.5·0.59=0.60.

Although embodiments discussed herein disclose a promotion structure margin determined based at least upon the discount d provided to the consumer and the total number of promotion units to sell u, one of ordinary skill in the art may appreciate that the promotion structure margin may be based upon any number of factors influencing the structure of the promotion. For example, a promotion structure margin may be influenced by the location and/or method of the promotion placement (i.e., a prominent promotion placement may lower the promotion structure margin, and thus, a provider margin), the volume and/or resources the promotion and marketing service uses for the provider's promotion (i.e., a promotion having 1 million impressions will result in a lower promotion structure margin than a promotion having 1,000 impressions), the type of consumers targeted with the promotion (i.e., a promotion targeting high-value consumers, such as a consumer who typically purchase promotions, a high-income consumer, and/or the like, may result in a lower promotion structure margin) and/or the like. Accordingly, a promotion structure margin may be based on any number of factors that may relate to the structure of the promotion.

In some embodiments, the provider parameter system may be configured to determine a positive return on investment ("ROI") margin at 312. According to one embodiment, the provider parameter system may be configured to determine a positive ROI margin based upon past promotions offered and the margin thresholds necessary for a positive ROI in those past promotions. In another embodiment, the provider parameter system may be configured to determine a positive ROI margin based at least upon a Monte Carlo simulation used to derive an empirical distribution, from which the probability of $\pi$ being positive may be determined, where $\pi$ is the profit per instrument divided by the unit price. The unit price may be defined as the price a consumer pays for the goods, services, experiences and/or the like.

In this regard, $\pi$, the profits per instrument divided by the unit price may be expressed by the equation, $$\pi = pf[(\mu+s+r)-k(v+s+r)]-p(1-f)(v-\mu)+f(1-p)[(p+s'+r')-k(1+s'+r')]-(1-p)(1-f)(1-\mu)$$

wherein, v is the unit value divided by the unit price. The unit value may be defined as the original price of the good, service and/or experience before the promotion was offered. Further,
1. r is the average return amount spent by a consumer divided by the unit price (i.e. revenue associated with repeat business per unit price),
2. r' is the average return amount spent after the expiration of the promotion period divided by the unit price (i.e., revenue associated with repeat business after promotion expiration per unit price),
3. s is the average amount spent in addition to the promotion divided by the unit price (i.e., revenue upsale per unit price),
4. s' is the average amount spent in addition to the promotion after the promotion period expires divided by the unit price (i.e., non-redemption revenue per unit price),
5. k is the variable cost as a percentage of the total check amount (i.e., the variable cost as a percentage of the total amount of a consumer's transaction),
6. f is the new customer fraction (i.e., the amount of new consumers that had not previously purchased goods and/or services from the provider), and
7. p is the final redemption percentage (i.e., the percentage of instruments that are redeemed).

In addition, the above variables may be computed with respect to the particular provider's category.

In estimating the positive ROI margin, the provider parameter system may be configured to utilize certain assumptions when performing the Monte Carlo simulations. For example, the ROI per instrument may be assumed to be independent from the volume of the units sold. As such, when $\pi$, the profits per instrument divided by the unit price, is greater than zero, the ROI may be interpreted as being positive for the promotion campaign. In some embodiments, the provider parameter system may assume a correlation exists between the unit price and whether a consumer purchases additional goods and services and/or returns to the provider in the future for other goods, services and the like.

According to some embodiments, the provider parameter system may also assume that redeeming promotions by existing consumers is a cannibalization of sales. Further, it may be assumed that a consumer would spend the same amount regardless of having a promotion instrument, such as a coupon. The provider parameter system may further assume a final redemption rate of 85%. In another embodiment, the provider parameter system may use a redemption rate percentage from the provider's past promotions. Further, it may be assumed that all expired instruments will be redeemed at the unit price. In some embodiments, the amount spent in addition to the promotion and the amount spent in a subsequent visit by a consumer may be assumed to be zero for expired instruments.

As such, the positive ROI margin may be determined using the approximated distributions obtained by the Monte Carlo simulations and user input data corresponding to the category of the merchant c, the discount provided d, and the cost of goods sold percentage k, as represented by the equation, $$\mu_r(m_i, d) = \left\{ \mu \;\middle|\; P\!\left(\pi\!\left(\mu, c_{m_i}, k_{c_{m_i}}, \frac{1}{d}\right)\right) > 0 \right\}$$

where the discount provided d is defined as 1/v. According to one embodiment, the positive ROI margin may be determined to be 0.61 for a spa and health services provider, such as Acme Spa Company.

At 314, the provider margin may be determined by the provider parameter system. According to some embodiments, the provider margin may be any one of the historical information margin, the provider profile margin, the promotion structure margin, the positive ROI margin, or a combination thereof. In some embodiments, the provider parameter system may be configured to determine a provider margin based upon a linear combination of any one of the historical information margin, the provider profile margin, the promotion structure margin, and the positive ROI margin. For example, the provider margin may be defined by the equation, $$\mu(m_i, d, u) = \begin{cases} l(\{\mu_p(m_i), \mu_d(m_i, d, u), \mu_h(m_i), \mu_r(m_i, d)\}) & \text{if Case 1} \\ l(\{\mu_p(m_i), \mu_d(m_i, d, u), \mu_r(m_i, d)\}) & \text{if Case 2} \\ l(\{\mu_p(m_i), \mu_h(m_i)\}) & \text{if Case 3} \\ l(\{\mu_p(m_i)\}) & \text{if Case 4} \end{cases}$$

where l(M) is a linear combination of the margins in set M according to the following equation, $$l(M) = \sum_{u_i \in M} \alpha_i \cdot \mu_i$$

where $\alpha_i \in [0,1], \forall i$ and $\Sigma_i \alpha_i = 1$. According to some embodiments, the combinations could be non-linear combinations. Accordingly, embodiments may advantageously provide for the flexible determination of a provider margin based upon an appropriate weighting of desired factors for particular cases, such as those described herein.

In Case 1, past historical information for the provider $m_i$ exists and a promotion structure is to be evaluated in determining the margin. In Case 2, no past historical information for the provider $m_i$ exists, but a promotion structure is to be evaluated in determining the margin. In Case 3, historical information for the provider $m_i$ exists, but no promotion structure is to be evaluated in determining the margin. In Case 4, no past historical information for the provider $m_i$ exists and no promotion structure is to be evaluated in determining the margin. Accordingly, in one embodiment where the past historical information for Acme Spa Company exists and a promotion structure is being evaluated to determine the margin, the provider margin for Acme Spa Company may be defined as the linear combination of the historical information margin, the provider profile margin, the promotion structure margin, and the positive ROI margin. Specifically, an embodiment may use $\alpha = 0.25$ to obtain the equation, $$\mu(\text{Acme}) = 0.25 \cdot \mu_p(\text{Acme}) + 0.25 \cdot \mu_d(\text{Acme}) + 0.25 \cdot \mu_h(\text{Acme}) + 0.25 \cdot \mu_r(\text{Acme})$$

which equals, $$\mu(\text{Acme}) = (0.25 \cdot 0.58) + (0.25 \cdot 0.59) + (0.25 \cdot 0.60) + (0.25 \cdot 0.61) = 0.595$$

Accordingly, the provider margin for Acme Spa Company in an instance where a promotion structure is being evaluated and historical information exists is 0.595.

According to another embodiment, the provider margin may be determined by the provider parameter system at 312 by computing the maximum between the positive ROI margin and a linear combination of other margins, such as the historical information margin, the provider profile margin and/or the promotion structure margin. For example, the following equation may be used to determine the provider margin, $$\mu(m_i, d, u) = \begin{cases} \max(\mu_r(m_i, d), l(\{\mu_p(m_i), \mu_d(m_i, d, u), \mu_h(m_i)\})) & \text{if Case 1} \\ \max(\mu_r(m_i, d), l(\{\mu_p(m_i), \mu_d(m_i, d, u)\})) & \text{if Case 2} \\ l(\{\mu_p(m_i), \mu_h(m_i)\}) & \text{if Case 3} \\ l(\{\mu_p(m_i)\}) & \text{if Case 4} \end{cases}$$

where l(M) is a linear combination of the margins in set M according to the following equation, $$l(M) = \sum_{u_i \in M} \alpha_i \cdot \mu_i$$

where $\alpha_i \in [0,1], \forall i$ and $\Sigma_i \alpha_i = 1$. In some embodiments, the combinations may be non-linear combinations. As such, embodiments may advantageously provide for the flexible determination of a provider margin based upon an appropriate weighting of desired factors for particular cases, such as those described herein.

The provider margin may be any combination of any of the historical information margin, provider profile margin, promotion structure margin, and/or positive ROI margin. In some embodiments, the provider margin may be a linear combination of any of the historical information margin, provider profile margin, promotion structure margin, and/or positive ROI margin. Although embodiments discussed herein disclose a provider margin obtained from a linear combination of any one of the historical information margin, provider profile margin, promotion structure margin, and/or positive ROI margin, one of ordinary skill in the art may appreciate that a provider margin may be determined by any suitable aggregation of any one of the historical information margin, provider profile margin, promotion structure margin, and/or positive ROI margin.

Although embodiments discussed herein provide for determining a provider margin as a percentage of the total revenue retained by the provider, one of ordinary skill in the art may appreciate that another embodiment may provide for determining a provider margin as a fixed dollar amount of the total revenue retained by the provider. In some embodiments, the provider parameter system may be configured to determine a percentage of the total revenue and determine a dollar amount based, at least, on the percentage value of the total revenue. According to another embodiment, the provider parameter system may be configured to determine a fixed fee amount based upon a comparison of the percentage of the total revenue, the total dollar amount based upon, at least, the percentage of the total revenue, and/or any other suitable provider margin metric. For example, a provider parameter system may be configured to determine that a provider with no provider profile and having no promotion structure for evaluation should receive a maximum fixed fee provider margin.

In another embodiment, one of ordinary skill in the art may appreciate that the provider parameter system may be leveraged for determining a provider margin for a fixed fee amount based at least upon an amount of consumer traffic a promotion and marketing service provides a provider by illustrating or otherwise informing a consumer of a provider via an impression. Accordingly, in some embodiments, the provider parameter system may provide a provider wishing to generate increased web traffic to the provider's virtual web-based store with a provider margin based at least upon the number of consumers that visit the provider's virtual web-based store via the impression distributed by a promotion and marketing service.

At 316, the provider parameter system may be configured to transmit data corresponding to the provider margin to a mobile device, such as the provider device. In one embodiment, a provider may provide promotion parameter data, provider characteristic data, and/or the like to the provider parameter system via a provider device. The provider parameter system may then determine the provider margin, as described in embodiments herein, and transmit data corresponding to the provider margin to the provider. In another embodiment, a representative of the promotion and marketing service may discuss the promotion parameters and the provider characteristics during a negotiation between the provider and the representative for promotion and marketing services. As such, the representative may transmit data corresponding to promotion parameter data, provider characteristic data, and/or the like to the provider parameter system via a mobile device. The provider parameter system may then transmit data corresponding to a provider margin, which the representative may then present to a provider. Accordingly, the provider parameter system may receive the promotion parameter data, provider characteristic data, and/or the like, and may subsequently determine a provider margin that may, on average, be accepted by the provider upon its first presentation. As such, no further negotiations between the provider and the promotion and marketing service is required. Some embodiments may advantageously provide for rewarding good provider by providing providers having esteemed qualities with a provider margin that is higher than a provider margin offered to bad providers having undesirable qualities. Accordingly, a good provider may likely accept the higher provider margin upon its first presentation. As such, embodiments discussed herein may advantageously provide for an efficient transaction between a provider and a promotion and marketing service.

In another embodiment, the provider parameter system may be configured to transmit data corresponding to a range of provider margins to a representative. As such, the representative may then negotiate with the provider for a provider margin within the determined range. In another embodiment, the provider parameter system may transmit data to a representative corresponding to a provider margin limit so as to indicate to the representative the maximum and/or minimum provider margin that may be offered to the provider. The process may end at 318.

Exemplary System Interface

Figure 5:
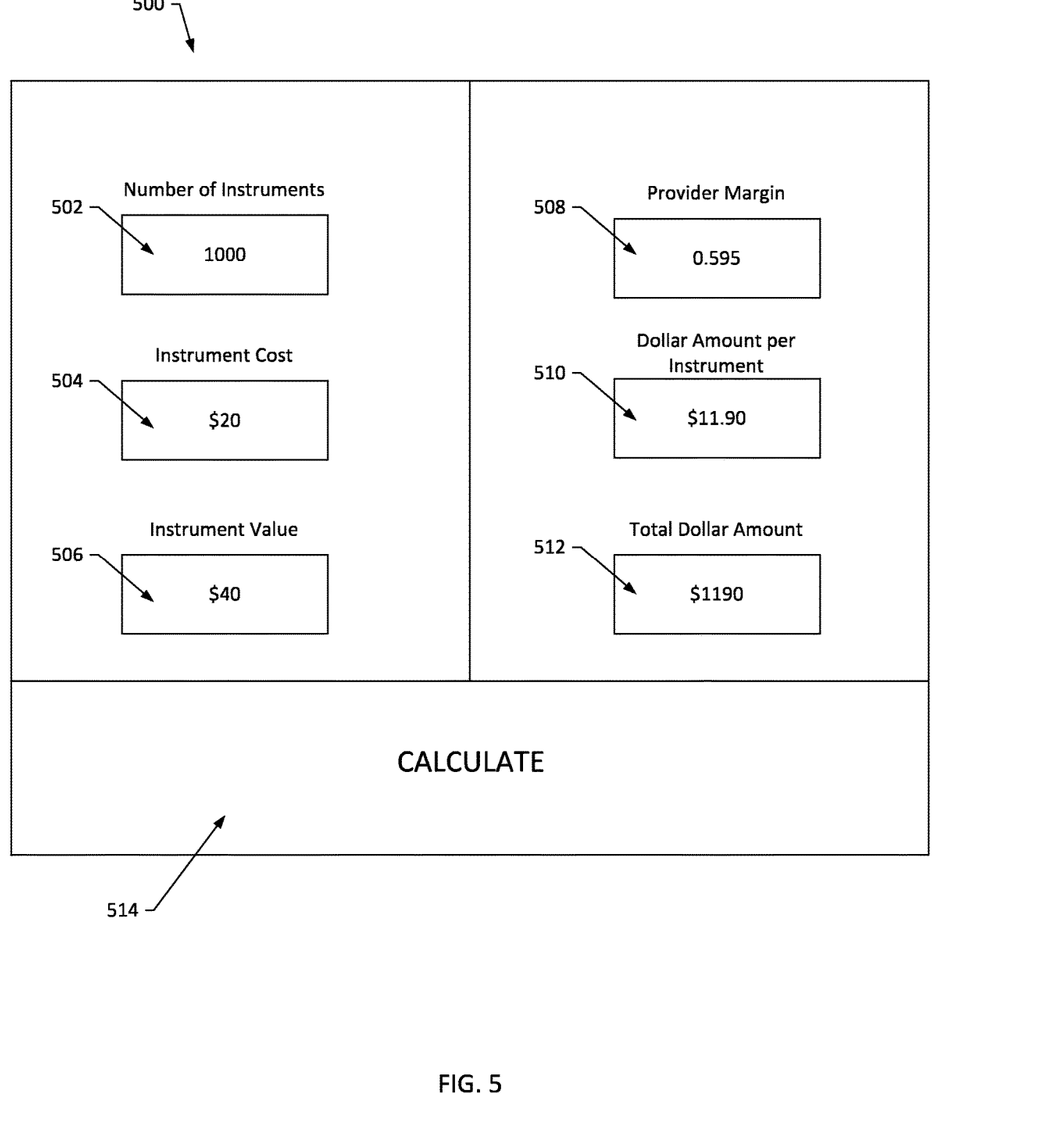
FIG. 5 illustrates an example interface according to an example embodiment.

As shown in FIG. 5, an interface 500 configured to display a provider parameter, such as a provider margin, to a provider. In some embodiments, the interface 500 may be displayed by a provider device, a sales representative device, and/or a user interface of a provider parameter system. The interface 500 may illustrate a total number of instruments quantity 502, an instrument cost 504, and an instrument value 506. In some embodiments, the interface 500 may illustrate a provider parameter, such as a provider margin 508. In addition, the interface 500 may optionally illustrate the provider margin in a dollar quantity, such as the dollar amount per instrument value 510. Further, the interface 500 may illustrate the total dollar amount value 512 a provider may receive from engaging in a particular promotion with a promotion and marketing service provider.

According to some embodiments, a provider may view the interface 500 on a provider device. Further, the interface 500 may be configured to receive an input corresponding to the total number of instruments quantity 502, the instrument cost 504, and the instrument value 506. For example, a provider may select the field corresponding to the total number of instruments quantity 502 and provide an input corresponding to the total number of instruments the provider wishes to offer for a particular promotion. Likewise, the provider may provide an input corresponding to the instrument cost and the instrument value at the respective fields 504, 506. Once a provider has completed an input process, the provider may select the calculate portion 514 to determine a provider parameter, such as the provider margin 508. In some embodiments, the interface 500 may be configured to display the provider margin 508, the dollar amount per instrument 510, and the total dollar amount 512 upon receiving an indication corresponding to a selection of the calculate portion 514 of the interface. Although the interface 500 in FIG. 5 illustrates three input fields 502, 504, 506 and three output fields 508, 510, 512, one of skill in the art may appreciate that any number of input and output fields may be displayed by an interface 500. In some embodiments, the interface 500 may be displayed on a sales representative device. Accordingly, the sales representative may provide the interface with various inputs corresponding to respective provider parameters, promotion parameters and/or the like. As such, the interface may be configured to display a provider parameter, such as a provider margin, to the sales representative such that the representative may begin a negotiation process with a provider.

In some embodiments, the interface may be further configured to receive an input corresponding to provider characteristic data, such as registration information, provider name, provider category, provider location, and/or the like. Further, the interface may be configured to receive an input corresponding to a promotion structure, such as the total number of instruments to be sold, the instrument cost, and/or the instrument value, as shown in FIG. 5. The interface may be further configured to receive an input corresponding to a plurality of promotion structures such that a provider parameter, such as a provider margin, may be determined for a number of provider promotions based at least on the total number of promotion structures the provider wishes to offer.

Exemplary System Architecture

Figure 4:
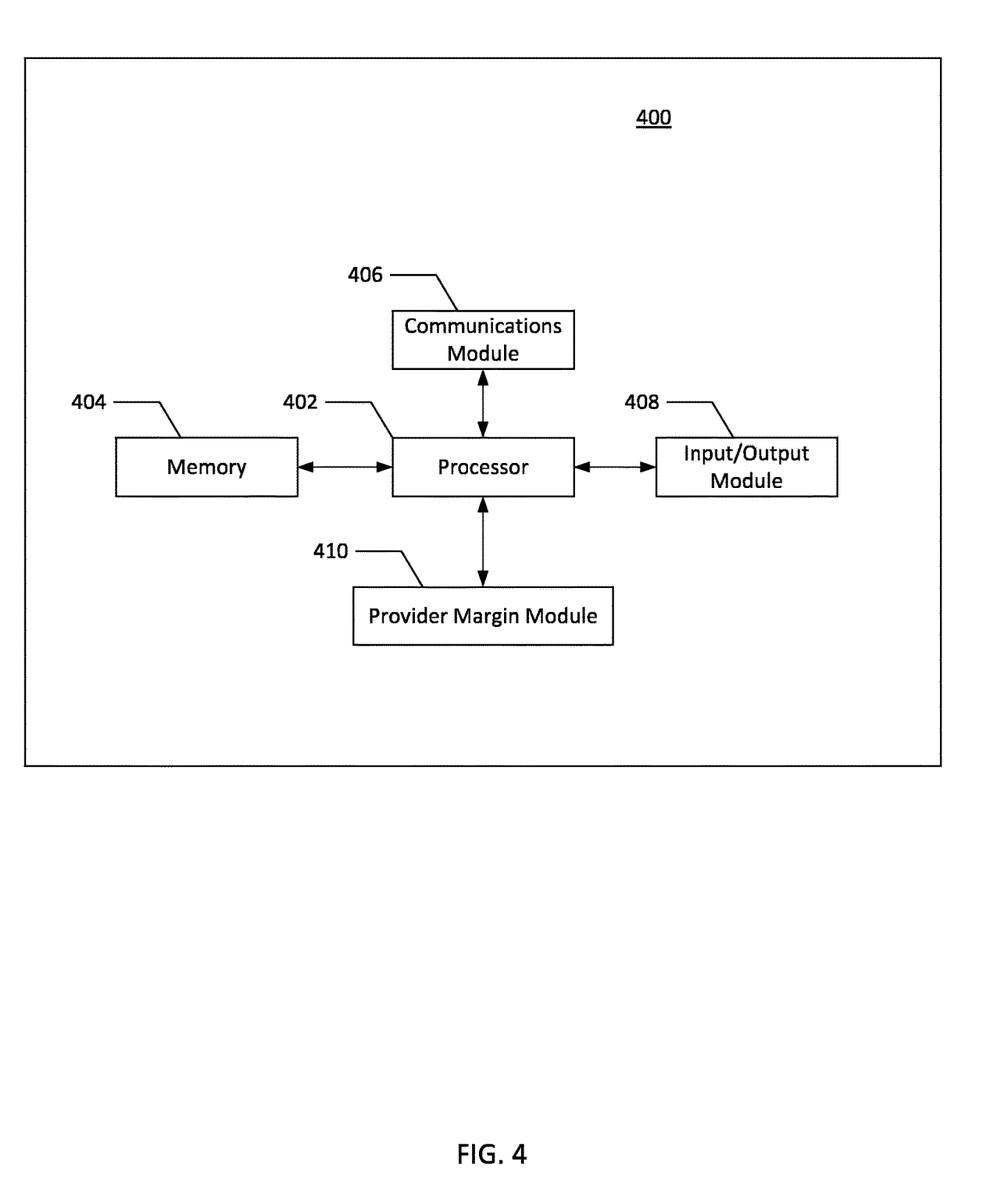
FIG. 4 illustrates a block diagram of circuitry which may be included in a provider parameter system and/or a mobile device according to an example embodiment.

FIG. 4 illustrates a schematic block diagram of circuitry 400, some or all of which may be included in, for example, provider parameter module 102, provider parameter database 104 and/or mobile device 110. As illustrated in FIG. 4, in accordance with some example embodiments, circuitry 400 may include various means, such as a processor 402, memory 404, communication module 406, input/output module 408 and/or provider margin module 410.

In some embodiments, such as when circuitry 400 is included in a provider parameter system 100 and/or mobile device 110, provider margin module 410 may be included. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 is embodied as an executor of instructions, such as may be stored in memory 404, the instructions may specifically configure processor 402 to perform one or more algorithms and operations described herein.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data, applications, instructions, or the like for enabling circuitry 400 to carry out various functions in accordance with example embodiments discussed herein. For example, in at least some embodiments, memory 404 is configured to buffer input data for processing by processor 402. Additionally or alternatively, in at least some embodiments, memory 404 may be configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second circuitry 400 and/or the like. In some embodiments, communications module 406 (like other components discussed herein) can be at least partially embodied as or otherwise controlled by processor 402. In this regard, communications module 406 may be in communication with processor 2402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive an indication of a user input and/or to provide an audible, visual, mechanical, or other output to a user. Some example visual outputs that may be provided to a user by circuitry 400 are discussed in connection with the displays described above. As such, input/output module 408 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 400 is embodied as a server or database, aspects of input/output module 408 may be reduced as compared to embodiments where circuitry 400 is implemented as an end-user machine (e.g., consumer device and/or merchant device) or other type of device designed for complex user interactions. In some embodiments (like other components discussed herein), input/output module 408 may even be eliminated from circuitry 400. Input/output module 408 may be in communication with memory 404, communications module 406, and/or any other component(s), such as via a bus. Although more than one input/output module and/or other component can be included in circuitry 400, only one is shown in FIG. 8 to avoid overcomplicating the drawing (like the other components discussed herein).

Provider margin module 410 may also or instead be included and configured to perform the functionality discussed herein related to facilitating the determination of a provider parameter, such as a provider margin, as discussed above. In some embodiments, some or all of the functionality facilitating determining a provider margin may be performed by processor 402. In this regard, the example processes and algorithms discussed herein can be performed by at least one processor 402 and/or provider margin module 410. For example, non-transitory computer readable storage media can be configured to store firmware, one or more application programs, and/or other software, which include instructions and other computer-readable program code portions that can be executed to control processors of the components of system 400 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

That which is claimed:

1. A method comprising:
providing a web-based interface configured for display at a merchant device and for receiving input of provider characteristic data;
receiving, via an input process at the web-based interface configured for display the merchant device provided by a promotion and marketing service configured to provide impressions to consumers offering one or more promotions describing at least a good or service being offered by a provider, the provider characteristic data, the provider characteristic data comprising provider name data indicative of a provider name, provider category data indicative of a provider category, and provider location data indicative of a provider location;
upon completion of the input process, receiving input, via the web-based interface configured for display at the merchant device, instructing the promotion and marketing service to define provider margin data;
determining, by the processor, via access to a database, whether data indicative of one or more of a historical information margin and a provider structure margin is stored and available for access;
determining, via a provider margin module and a processor, a provider profile margin and a positive return on investment margin,
wherein the provider margin data is based on one or more of the provider characteristic data, the provider margin data being indicative of a provider margin for a promotion;
aggregating the historical information margin, the provider profile margin, the promotion structure margin, and the positive return on investment margin in accordance with a dynamic weighting of each of the historical information margin, the provider profile margin, the promotion structure margin, and the positive return on investment margin to generate the provider margin data; and
presenting, via the system interface configured for display at the merchant device, the provider margin data in real-time upon receiving the instruction to calculate the provider margin data to the system interface.

2. The method of claim 1, wherein determining of the provider margin data comprises:
determining historical information margin data;
determining provider profile margin data;
determining promotion structure margin data based on one or more redemption parameters of the promotion;
determining a positive return on investment margin based upon past promotions offered and the margin thresholds necessary for a positive return of investment in those past promotions; and
aggregating the historical information margin, the provider profile margin, the promotion structure margin, and the positive return on investment margin to generate the provider margin data.

3. The method of claim 2, wherein determining the historical information margin data comprises:
accessing data indicative of previous provider margins given to providers of a same provider category and adjusting an aggregate of the previous provider margin data with an increase or decrease based on consumer review data indicative of consumer reviews of the provider; and
accessing historical provider margin data for the provider and adjusting the historical provider margin data based on historical review score data, the historical review score data being an aggregate of data indicative of historical reviews of the particular provider.

4. The method of claim 2, wherein determining the provider profile margin data comprises:
determining the provider category based on the provider category data;
determining the provider location based on the provider location data;
calculating a provider quality score based on one or more of review data indicative of a quantity and a quality of consumer reviews of the provider, complaints data indicative of complaints received by consumer protection agencies corresponding to the provider, social data indicative of a social media presence, and refund data indicative of an amount of refunds issued; and
determining, via an aggregation function, the provider profile margin utilizing the provider category data, the provider location data, and the provider quality score data as inputs.

5. The method of claim 2, wherein determining the promotion structure margin data based on one or more redemption parameters of the promotion comprises:
determining the provider category;
determining average margin data indicative of an average margin for the provider category;
identifying discount data indicative of a discount provided to the consumer in the promotion;
determining promotion target data indicative of a total number of promotion units to sell; and
calculating, via a linear combination, the promotion structure margin as a function of the provider category data, the average margin data for the provider category, the discount data, and the promotion target data.

6. The method of claim 1, wherein the determination of the provider margin data is based upon a weighting of one or more predefined factors and is dependent on which type or types of data are available.

7. A computer program product, the computer program product comprising a non-transitory computer-readable storage medium storing computer program code that, when executed by an apparatus, causes the apparatus to:
providing a web-based interface configured for display at a merchant device and for receiving input of provider characteristic data;
receiving, via an input process at the web-based interface configured for display the merchant device provided by a promotion and marketing service configured to provide impressions to consumers offering one or more promotions describing at least a good or service being offered by a provider, the provider characteristic data, the provider characteristic data comprising provider name data indicative of a provider name, provider category data indicative of a provider category, and provider location data indicative of a provider location;

upon completion of the input process, receiving input, via the system interface configured for display at the merchant device, instructing the promotion and marketing service to define provider margin data;

determining, by the processor, via access to a database, whether data indicative of one or more of a historical information margin and a provider structure margin is stored and available for access;

determining, via a provider margin module and a processor, a provider profile margin and a positive return on investment margin, wherein the provider margin data is based on one or more of the provider characteristic data, the provider margin data being indicative of a provider margin for a promotion;

aggregating the historical information margin, the provider profile margin, the promotion structure margin, and the positive return on investment margin in accordance with a dynamic weighting of each of the historical information margin, the provider profile margin, the promotion structure margin, and the positive return on investment margin to generate the provider margin data; and presenting, via the system interface configured for display at the merchant device, the provider margin data in real-time upon receiving the instruction to calculate the provider margin data to the system interface.

8. The computer program product of claim 7, wherein determining of the provider margin data comprises:

determining historical information margin data;

determining provider profile margin data;

determining promotion structure margin data based on one or more redemption parameters of the promotion;

determining a positive return on investment margin based upon past promotions offered and the margin thresholds necessary for a positive return of investment in those past promotions; and aggregating the historical information margin, the provider profile margin, the promotion structure margin, and the positive return on investment margin to generate the provider margin data.

9. The computer program product of claim 8, wherein determining the historical information margin data comprises:

accessing data indicative of previous provider margins given to providers of a same provider category and adjusting an aggregate of the previous provider margin data with an increase or decrease based on consumer review data indicative of consumer reviews of the provider; and accessing historical provider margin data for the provider and adjusting the historical provider margin data based on historical review score data, the historical review score data being an aggregate of data indicative of historical reviews of the particular provider.

10. The computer program product of claim 9, wherein determining the provider profile margin data comprises:

determining the provider category based on the provider category data;

determining the provider location based on the provider location data;

calculating a provider quality score based on one or more of review data indicative of a quantity and a quality of consumer reviews of the provider, complaints data indicative of complaints received by consumer protection agencies corresponding to the provider, social data indicative of a social media presence, and refund data indicative of an amount of refunds issued; and determining, via an aggregation function, the provider profile margin utilizing the provider category data, the provider location data, and the provider quality score data as inputs.

11. The computer program product of claim 8, wherein determining the promotion structure margin data based on one or more redemption parameters of the promotion comprises:

determining the provider category;

determining average margin data indicative of an average margin for the provider category;

identifying discount data indicative of a discount provided to the consumer in the promotion;

determining promotion target data indicative of a total number of promotion units to sell; and calculating, via a linear combination, the promotion structure margin as a function of the provider category data, the average margin data for the provider category, the discount data, and the promotion target data.

12. The computer program product of claim 7, wherein the determination of the provider margin data is based upon a weighting of one or more predefined factors and is dependent on which type or types of data are available.

13. An apparatus comprising at least one processor and at least one memory including computer program code, the at least one memory and the computer program code configured to, with the at least one processor, cause the apparatus to:

provide a web-based interface configured for display at a merchant device and for receiving input of provider characteristic data;

receive, via an input process at the web-based interface configured for display the merchant device provided by a promotion and marketing service configured to provide impressions to consumers offering one or more promotions describing at least a good or service being offered by a provider, the provider characteristic data, the provider characteristic data comprising provider name data indicative of a provider name, provider category data indicative of a provider category, and provider location data indicative of a provider location;

upon completion of the input process, receiving input, via the web-based interface configured for display at the merchant device, instruct the promotion and marketing service to define provider margin data;

determine, by the processor, via access to a database, whether data indicative of one or more of a historical information margin and a provider structure margin is stored and available for access;

determine, via a provider margin module and a processor, a provider profile margin and a positive return on investment margin, wherein the provider margin data is based on one or more of the provider characteristic data, the provider margin data being indicative of a provider margin for a promotion;

aggregate the historical information margin, the provider profile margin, the promotion structure margin, and the positive return on investment margin in accordance with a dynamic weighting of each of the historical information margin, the provider profile margin, the promotion structure margin, and the positive return on investment margin to generate the provider margin data; and present, via the system interface configured for display at the merchant device, the provider margin data in real-time upon receiving the instruction to calculate the provider margin data to the system interface.

14. The apparatus of claim 13, wherein determining of the provider margin data comprises:
    determining historical information margin data;
    determining provider profile margin data;
    determining promotion structure margin data based on one or more redemption parameters of the promotion;
    determining a positive return on investment margin based upon past promotions offered and the margin thresholds necessary for a positive return of investment in those past promotions; and
    aggregating the historical information margin, the provider profile margin, the promotion structure margin, and the positive return on investment margin to generate the provider margin data.

15. The apparatus of claim 14, wherein determining the historical information margin data comprises:
    accessing data indicative of previous provider margins given to providers of a same provider category and adjusting an aggregate of the previous provider margin data with an increase or decrease based on consumer review data indicative of consumer reviews of the provider; and
    accessing historical provider margin data for the provider and adjusting the historical provider margin data based on historical review score data, the historical review score data being an aggregate of data indicative of historical reviews of the particular provider.

16. The apparatus of claim 14, wherein determining provider profile margin data comprises:
    determining the provider category based on the provider category data;
    determining the provider location based on the provider location data;
    calculating a provider quality score based on one or more of review data indicative of a quantity and a quality of consumer reviews of the provider, complaints data indicative of complaints received by consumer protection agencies corresponding to the provider, social data indicative of a social media presence, and refund data indicative of an amount of refunds issued; and
    determining, via an aggregation function, the provider profile margin utilizing the provider category data, the provider location data, and the provider quality score data as inputs.

17. The apparatus of claim 14, wherein determining the promotion structure margin data based on one or more redemption parameters of the promotion comprises:
    determining the provider category;
    determining average margin data indicative of an average margin for the provider category;
    identifying discount data indicative of a discount provided to the consumer in the promotion;
    determining promotion target data indicative of a total number of promotion units to sell; and
    calculating, via a linear combination, the promotion structure margin as a function of the provider category data, the average margin data for the provider category, the discount data, and the promotion target data.

18. The apparatus of claim 13, wherein the determination of the provider margin data is based upon a weighting of one or more predefined factors and is dependent on which type or types of data are available.

* * * * *